United States Patent [19]

Franciscovich

[11] 3,743,486

[45] July 3, 1973

[54] METHOD OF SUBSURFACE BURNING OF QUANTITIES OF REFUSE MATERIAL AND A FUEL MIXTURE FOR USE IN THE METHOD

[75] Inventor: John A. Franciscovich, Aberdeen, Wash.

[73] Assignee: Fibre-Weld, Inc., Aberdeen, Wash.

[22] Filed: Sept. 24, 1969

[21] Appl. No.: 860,798

Related U.S. Application Data

[60] Division of Ser. No. 836,216, June 12, 1969, abandoned, which is a continuation of Ser. No. 634,482, April 28, 1967, abandoned.

[52] U.S. Cl. .................................................. 44/51
[51] Int. Cl. .............................................. C10l 1/32
[58] Field of Search ................... 44/51, 1; 110/8 C, 110/7, 18, 21; 166/11, 38

[56] References Cited
UNITED STATES PATENTS

| | | | |
|---|---|---|---|
| 526,283 | 9/1924 | Anderson | 110/8 C |
| 2,871,941 | 2/1959 | Allen et al. | 110/21 |
| 3,322,194 | 5/1967 | Strubhar | 166/11 |
| 3,334,598 | 8/1967 | Overfield | 110/18 C |
| 3,506,414 | 4/1970 | Skendrovic | 44/1 |
| 3,540,866 | 11/1970 | Miller | 44/51 |

FOREIGN PATENTS OR APPLICATIONS

| | | | |
|---|---|---|---|
| 292,217 | 6/1928 | Great Britain | 44/51 |

*Primary Examiner*—Daniel E. Wyman
*Assistant Examiner*—Mrs. Y. H. Smith
*Attorney*—Seed, Berry & Dowrey

[57] ABSTRACT

The incineration of quantities of refuse material by subsurface burning at high temperatures is attained by injecting fuel in the refuse and igniting it to heat nitrogenous material to the point of self-sustained burning.

3 Claims, No Drawings

METHOD OF SUBSURFACE BURNING OF QUANTITIES OF REFUSE MATERIAL AND A FUEL MIXTURE FOR USE IN THE METHOD

CROSS REFERENCE TO RELATED APPLICATIONS

This application is a divisional application of Ser. No. 836,216 filed June 12, 1969 now abandoned which is a continuation application of Ser. No. 634,482, filed Apr. 28, 1967 now abandoned.

BACKGROUND OF THE INVENTION

One of the major problems associated with garbage dumps, refuse landfills, and the like, is the unsanitary conditions created by their presence and the difficulty and expense in reclaiming the land occupied thereby. One commonly practiced method of reclaiming this land is to burn the refuse, either on a periodic or a continuous basis, in the open air. This, however, substantially contributes to air pollution and is therefore not a desirable solution to the problem. Another commonly practiced method is to create a so-called "sanitary landfill" wherein several inches of dirt is spread across the surface of the refuse periodically so that alternating layers of refuse and dirt are built up over a long period of time. The eventual intent is to permit this landfill area to settle and then build on it. This, however, requires many years of settling, during which water run off from the landfill creates a sanitation hazzard, and therefore also is not a desirable solution to the problem.

SUMMARY OF THE INVENTION

In brief, the present invention comprises a method for incinerating combustibles, domestic rubbish, commercial and industrial refuse and garbage in large quantities such as are found in refuse landfills or garbage dumps, and a preferred fuel for use in the method. Fuel is injected into a refuse landfill to a selected location beneath the landfill surface where nitrogenous gases have been created by natural decay of the vegetable and animal refuse material. The fuel is ignited in the selected subsurface region to heat the nitrogenous gases to the point of combustion to effect self sustained burning of the refuse material beneath the landfill surface. This process eliminates most of the problems connected with present inefficient methods of disposal of solid wastes; namely scenic blights, serious hazards to the public health, including pollution of air and water resources, accident hazards, increase in rodent and insect vendors of disease, adverse effects on land values and creation of public nuisances.

Inasmuch as greater volumes of nitrogenous gases resulting from decaying refuse material are likely to be created in older, more compacted regions of a refuse landfill or garbage dump, the landfill should be probed to locate the most appropriate region to begin the subsurface ignition of the landfill. One convenient means of locating those regions having concentrations of nitrogenous gases is to insert a pipe into the landfill and test the gases that pass therethrough by any one of a number of known procedures.

Although any subsurface region containing nitrogenous gases is suitable, such subsurface regions located near the edges of the landfill are preferred because of their accessibility. When a suitable region is found, for example one near a landfill edge, a tunnel is bored into the landfill at the base thereof. This tunnel need only be large enough to pass a fuel burner, and in general need only be a few feet in length. The burner, preferably ignited, is then inserted into the tunnel to heat the nitrogenous gases to a sufficiently high temperature to ignite them.

It has been discovered that these nitrogenous gases must attain a temperature on the order of 2,000°–3,000° F. or more to produce a self-sustained burning of the refuse material. Therefore, the fuel must have a relatively high heat content when ignited.

Once refuse burning becomes self-sustaining the burner is removed. The subsurface burning front progresses away from the ignition point in all directions thereby forming a subsurface cavity. As this cavity enlarges, the sides and top thereof fall in and are consumed as the front progresses inward. If noncombustable objects such as bathtubs, etc. impede the advance of the burning front, the fuel in liquid form and under pressure could be sprayed into the cavity to aid the burning front in circumventing the object. For reasons such as this, it is preferred that the igniting fuel be provided in liquid form.

The size of the burning subsurface cavity can become quite large. In one instance a landfill section of a depth on the order of 15–20 feet was substantially consumed before the walls thereof caved in and were consumed.

The heat generated in this method once refuse burning is self sustaining has been found to be of sufficient intensity to melt glass bottles and tin cans and consume all other objects discarded in refuse and garbage dumps with the exception of heavy metal which can be salvaged as clean scrap. Under such high temperature conditions, little smoke is created and what little is created has been traced to the presence of such materials as wood, rags, rope, rubber and bedding. Once the point of rapid oxidation is reached and provided the fill has been properly covered by dirt even the burning of these materials will contribute very little smoke. The smoke and gases arising from surface cracks in the fill cover, due to the high temperature or rodent trails for example are primarily steam vapors. Any such smoke and steam vapors can be contained at eye level through the use of a fog spray nozzle. The water eminating from the fog spray nozzle could contain a solution of orthophosphoric acid, the sodium salt of dodecylbenzenesulphonic acid and a nonionic detergent, which would destroy any bacteria which might become airborne.

The method of this invention is particularly suitable for so-called "sanitary landfills" where several inches of dirt are typically spread over the garbage to minimize stench and health hazards, and where the garbage is highly compacted as by garbage trucks traveling back and forth across the surface thereof. Under these conditions, the high intensity burning front characteristic of this invention advances more rapidly and can be controlled more easily than under conditions associated with loosely compacted landfills.

A preferred liquid igniting fuel comprises diesel oil containing a small proportion of an emulsion that promotes the attaining of high temperatures in subsurface refuse burning. The emulsion comprises a sodium hydroxide-water solution admixed with an oxidant such as chlorine, and maintained in suspension with the diesel oil by means of a suitable dispersant and emulsifying agent. It is preferred that the emulsion diesel oil ratio be about 1:20 on a volume basis (eg., 5 gals of emulsion to 100 gals. diesel oil).

A preferred dispersant and emulsifying agent is a water soluble nonionic surfactant condensate of the alkylphenolethylene oxide. This agent is particularly suitable for admixing the water base emulsion into the diesel oil.

A preferred emulsion consists of 12 grams of the preferred dispersant and emulsifying agent, 16 fluid oz. of chlorine, and a sodium hydroxide-water solution containing about 52 grams of sodium hydroxide to 1 gallon of water.

To further enhance the high temperature burning characteristics that the emulsion imparts to diesel oil, it is preferred that an oxidizer solution of the following composition be added to the emulsion: to 5 gals. of emulsion, add 1 wt. percent sodium peroxide, 1.5 wt. percent calcium hypochlorite, and 1 wt. percent ferric oxide.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. An oxidizing fuel for use in the subsurface ignition and burning of quantities of refuse material which consist essentially of diesel oil and an emulsion in a ratio of about 20:1, the emulsion containing a sodium hydroxide-water solution admixed with chlorine and a water soluble nonionic surfactant condensate of alkylphenylethylene oxide.

2. The fuel of claim 1 wherein the emulsion consists essentially of about 12 grams of said water soluble nonionic surfactant, about 15 fluid ounces of chlorine, and a sodium hydroxide-water solution containing about 52 grams of sodium hydroxide to one gallon of water.

3. The fuel of claim 1 including adding to the emulsion a mixture of sodium peroxide, calcium hypochlorite and ferric oxide.

* * * * *